G. JOHNSTON & L. CONRATH.
OPTOMETERS.
No. 195,135. Patented Sept. 11, 1877.
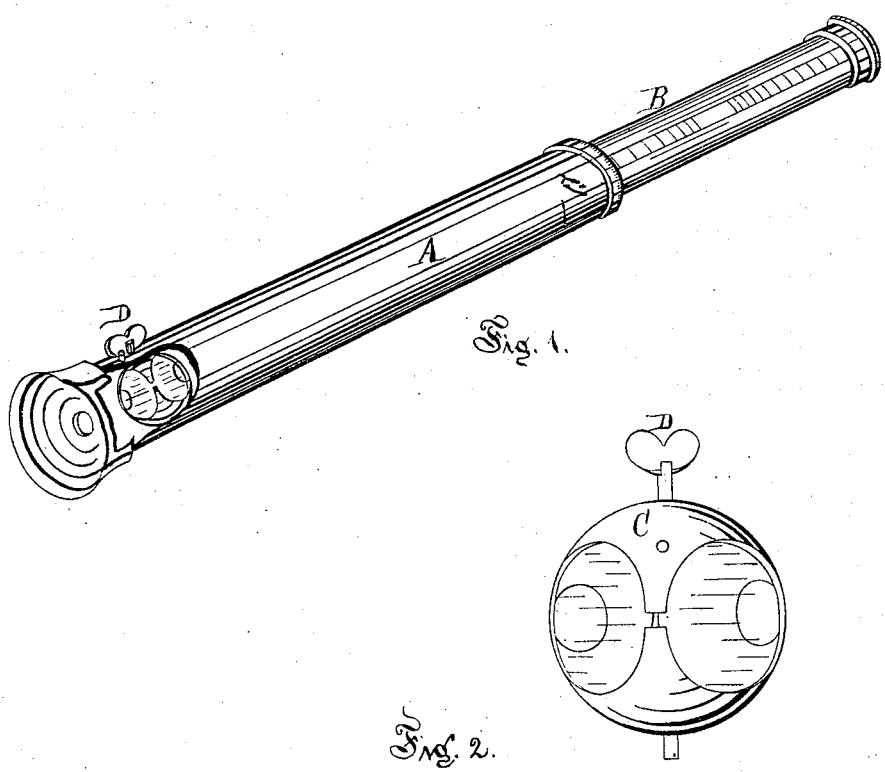

UNITED STATES PATENT OFFICE.

GEORGE JOHNSTON AND LOUIS CONRATH, OF DETROIT, MICHIGAN.

IMPROVEMENT IN OPTOMETERS.

Specification forming part of Letters Patent No. 195,135, dated September 11, 1877; application filed February 19, 1877.

*To all whom it may concern:*

Be it known that we, GEORGE JOHNSTON and LOUIS CONRATH, of the city of Detroit, in the county of Wayne and State of Michigan, have invented an Improvement in Optometers, or instruments for trying the length of vision in adapting spectacles to the eye, of which the following is a specification:

The nature of this invention relates to new and useful improvements in the construction of optometers, or instruments for trying the length of vision in adapting spectacles to the eye; and it consists in so constructing the instrument that not only the length of vision is accurately determined, but the quality or shape of the lens best adapted to the eye is ascertained at the same time.

In arriving at a correct conclusion as to the quality or kind of glass required, after the length of vision has been determined by the instrument in common use, spectacles of the correct focus are tried by the purchaser until it is ascertained whether a double convex lens or a periscopic lens is adapted to the eye.

In the instrument under consideration, and which is of the ordinary construction, known as telescopic optometers, except as hereinafter described, all the difficulties above alluded to are entirely avoided.

In the drawings, Figure 1 is a perspective of our instrument with a portion of the outer shell broken away, to show the rotating frame, carrying, at right angles to each other, glasses of different qualities but of the same focus. Fig. 2 is a detached view of the rotating frame.

A represents the shell, and B the telescopic sliding scale. C is a frame, carrying two lenses of different construction, one being a double convex, and the other a periscopic, set in the frame at right angles to each other. This frame is pivoted within the shell, near the end of which the eye is applied, and is operated from the outside by means of the thumb-piece D.

When the length of vision, or, as usually termed, the correct focus, has been determined, with the double convex lens presented to the eye, the frame may be rotated by means of the thumb-piece far enough to present the periscopic lens, when the difference in the clearness of the vision will dictate which style of glasses should be used.

What we claim as our invention, and desire to secure by Letters Patent, is—

The telescopic optometer A B, having within its shell a pivoted frame carrying lenses of different construction, substantially as and for the purposes set forth.

GEO. JOHNSTON.
LOUIS CONRATH.

Witnesses:
C. S. WALKER,
J. A. McCULLOCH.